US006174059B1

(12) United States Patent
Haley

(10) Patent No.: US 6,174,059 B1
(45) Date of Patent: Jan. 16, 2001

(54) EYEGLASSES AND METHOD OF VIEWING

(76) Inventor: James E. Haley, 10 Bow La., Barrington Hills, IL (US) 60010

( * ) Notice: Under 35 U.S.C. 154(b), the term of this patent shall be extended for 0 days.

(21) Appl. No.: 09/312,336

(22) Filed: May 14, 1999

(51) Int. Cl.$^7$ ..................................................... G02C 7/02
(52) U.S. Cl. ............................ 351/159; 351/41; D16/315
(58) Field of Search ...................................... 351/158, 159, 351/168, 41, 45, 52, 57; D16/100–101, 300, 306, 309, 315–316, 318

(56) References Cited

U.S. PATENT DOCUMENTS

| 3,771,858 | 11/1973 | Bivens | 351/159 |
| 3,773,407 | * 11/1973 | Stoner | 351/41 |
| 4,280,758 | 7/1981 | Flader et al. | 351/55 |
| 4,289,386 | 9/1981 | Brandstetter | 351/128 |
| 4,451,127 | 5/1984 | Moffitt, Jr. | 351/47 |
| 4,592,630 | 6/1986 | Okazaki | 351/169 |
| 4,861,153 | 8/1989 | Winthrop | 351/169 |
| 5,118,178 | * 6/1992 | Tuckman | 351/57 |
| 5,123,725 | 6/1992 | Winthrop | 351/169 |
| 5,124,734 | 6/1992 | Barnea | 351/169 |
| 5,745,211 | 4/1998 | Mukaiyama et al. | 351/169 |
| 5,767,939 | 6/1998 | Komatsu et al. | 351/159 |

* cited by examiner

Primary Examiner—Georgia Epps
Assistant Examiner—Jordan M. Schwartz
(74) Attorney, Agent, or Firm—Ryndak & Schwartz

(57) ABSTRACT

Eyeglasses are provided that allow the wearer a substantial upper vertical corrected field of vision and a substantial lower vertical uncorrected field of vision. The eyeglasses are particularly suitable for myopic persons having presbyopia enabling them to see objects at a distance through the lenses and objects that are relatively near through the lower vertical uncorrected field of vision, such as reading relatively fine print. A method is disclosed for providing a person a substantial upper vertical corrected field of vision and a substantial lower vertical uncorrected field of vision utilizing the inventive eyeglasses.

9 Claims, 3 Drawing Sheets

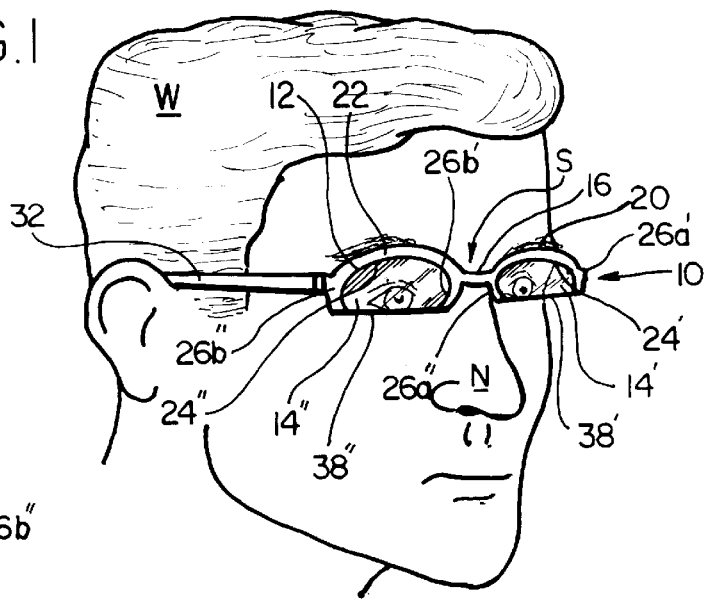
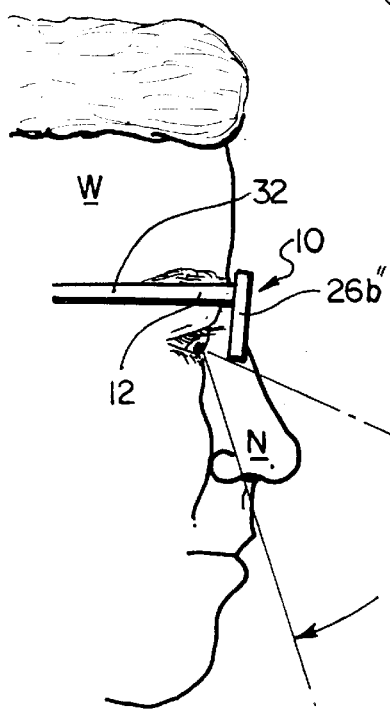
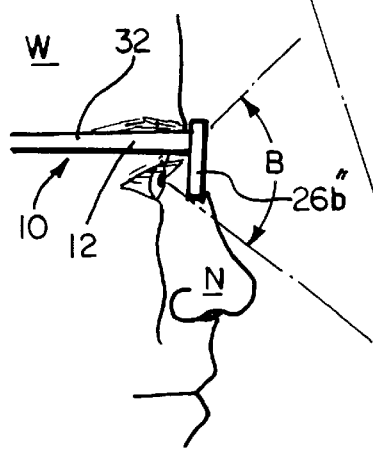
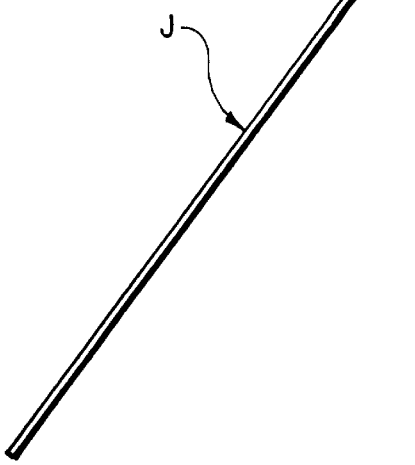

EYEGLASSES AND METHOD OF VIEWING

FIELD OF THE INVENTION

This invention relates to eyeglasses and a method of viewing objects. More particularly, the present invention relates to eyeglasses particularly intended to be worn by individuals having myopia who do not need correction to view nearby objects. The eyeglasses comprise a frame carrying two lenses, each having a left lens and a right lens which, when worn, are in optical registry with the left and right eyes, respectively. The lenses typically have a straight bottom edge which is horizontal. The bottom edge of the lenses aligns substantially with the lower portion of the eye in the area in the vicinity of the bottom edge of the cornea, enabling the wearer to view distant objects by looking through the lenses and to view nearby objects, without re-positioning the frame, by looking below the bottom edge of the lenses.

This invention also relates, in particular, to a method of using the eyeglasses by individuals having myopia and presbyopia to enable them to see objects both close up and at a distance without repositioning the frame.

BACKGROUND OF THE INVENTION

Myopia, also termed "nearsightedness," afflicts more than 70 million people in North America. The condition is characterized by the ability to see nearby objects clearly while distant objects appear blurry. Myopia starts to occur in people between the ages of eight and twelve and almost always before the age of twenty. It typically stabilizes in adulthood.

Presbyopia, a condition that occurs naturally in the aging process, is characterized by the lenses of the human eye losing their elasticity and consequently their ability to focus or accommodate for focused vision of objects located relatively close to the eye, such as reading a newspaper or a computer screen, for example. However, typically, myopic persons are able to view close objects in focus without the need for corrective lenses. Presbyopia usually occurs between ages forty and fifty.

Usually worn after the onset of presbyopia as people approach their mid-forties, bifocal lenses are one means for correcting the vision of people having myopia and presbyopia. In the bifocal lens eyeglasses, the top portion corrects the vision to allow for clear viewing at a distance and the bottom portion corrects vision to provide viewing of objects that are nearby. However, bifocal lenses are relatively expensive and require a user to view close objects through the lens.

Consequently, there exists a need for specialized eyeglasses for individuals who suffer from myopia and presbyopia that readily permit viewing of distant and close objects without the necessity of bifocal eyeglasses and the inherent limitations of such eyeglasses.

SUMMARY OF THE INVENTION

Accordingly, one aspect of the present invention provides a pair of eyeglasses to be worn by individuals having myopia and presbyopia but not needing eyesight correction for viewing close objects (e.g., typically in the range of from about 2–30 inches, for example). The inventive eyeglasses comprise a frame carrying two "upper-half" lenses to provide a substantial upper vertical field of vision that enable the wearer to look through the lenses for viewing objects at a distance and below the bottom edge of the lenses to provide a substantial lower vertical field of vision for viewing nearby objects. Typically, the lenses have a straight or substantially straight bottom edge which is horizontal or substantially horizontal when carried by the frame and worn by a person in a normal wearing position.

As used herein, "substantial vertical field of vision" means a vertical field of vision angle of at least about 40 degrees. The eyeglasses comprise a left lens, a right lens, a frame, including a central mounting structure to which the lenses are mounted, a central bridge portion and typically two temple bars attached to the frame for supporting the eyeglasses on a person's ears when worn. When the eyeglasses are positioned in the normal intended wearing position with the bridge over the upper bridge of the wearer's nose, the left lens is in optical registry with the wearer's left eye and the right lens is in optical registry with the wearer's right eye to provide a substantial uncorrected lower vertical field of vision, without adjusting the position of the eyeglasses on the wearer and a substantial upper vertical field of vision through the lenses for viewing objects at a distance.

The bottom edges of the lenses are substantially horizontal or horizontal and preferably unobstructed by the frame so that when the eyeglasses are worn, the bottom edges of the lenses are substantially vertically aligned with about the bottom of each of the person's eyes, generally with a horizontal line from between about 3 mm (millimeters) below the center of the wearer's pupil to about 3 mm below the bottom edge of the wearer's cornea, when the wearer's head is in a normal upright position, such as when standing or sitting erect and alternatively in that position the bottom edges of the lenses are located in the range of about 3 to 10 mm below the center of the wearer's pupil.

Alternatively, as another point of reference, the bottom edges of the lenses are in vertical alignment in the range of about 3 mm above to about 3 mm below the top edge of the wearer's bottom eyelid when the eye is in a normally open position. The horizontal distance from the wearer's eyes is typical for eyeglasses, usually in the range of about 5 to 30 mm from the central outer corneal surface. Such positioning creates a substantial lower vertical field of vision below the bottom edge for viewing objects close-up without repositioning the frame. Generally, the lenses will have a height to provide an upper vertical field of vision in the range of about 55°–90° and a lower uncorrected vertical field of vision in the range of about 40°–80°, without any repositioning of the eyeglasses on the wearer.

The inventive eyeglasses, which may comprise a specialized frame, enable the wearer to clearly view objects both at a distance and close-up without repositioning the frame and provide substantial upper (corrected) and lower (uncorrected) vertical fields of vision. The substantially horizontal (straight) bottom edge, preferably being unobstructed by the frame and aligned with the wearer's eyes as previously described, provides a substantial corrected upper vertical field of vision for clearly viewing distant objects through the lenses and a substantially uncorrected lower vertical field of vision for viewing close-up objects by looking below the bottom edge of the lens and without repositioning the frame on the wearer. The upper field for viewing distant objects is typically in a ratio of about 0.68:1 to 2.25:1, and more typically about 1.1 to about 1.8, relative to the lower field of vision for viewing close-up objects, depending on where the bottom edge of the lenses align with respect to the wearer's eyes.

Preferably, the bottom lens edge is straight or generally straight and is horizontal or substantially horizontal when the wearer's head is in a normal upright position, such as in FIG. 8, for example. As used herein throughout, the terms "horizontal" and "vertical" assume the wearer's head is in the aforementioned position, unless otherwise stated herein or indicated by the context. The bottom edge aligns with the bottom edge of the wearer's cornea, or the lowermost top edge of the wearer's bottom eyelid, when the eye is in a normally open position, providing an upper vertical viewing angle for viewing distant objects in the range of about 70–90 degrees wide and a lower vertical viewing angle for viewing close-up objects is in the range of about 45 to 65 degrees.

In another aspect of the present invention, the aforedescribed, inventive eyeglasses comprise a specialized frame including a right lens support structure, a left lens support structure, and a bridge connecting the right and left lens support structures. The left and right frame structures, in which the left and right lenses are mounted, do not extend along the bottom edge of the lenses, avoiding any viewing obstruction below the bottom edge of the lenses. The eyeglasses include a left lens secured to and extending downwardly from the left lens support and a right lens secured to and extending downwardly from the right lens support. When the frame is mounted in its normal orientation on the bridge of the wearer's nose, the left lens support is in substantial vertical alignment with the wearer's left eye and the right lens support is in substantial vertical alignment with the wearer's right eye so that each lens is in the desired optical registry with one of the wearer's eyes. The substantially horizontal bottom edge of the lenses aligns with a selected point, which generally should be between about 3 mm below the center of the wearer's pupil and about 3 mm below tile bottom edge of the wearer's cornea. The wearer can view objects at a distance through a corrected upper vertical field of vision when looking through the lenses and can view objects close-up, without repositioning the frame through an uncorrected lower vertical field of vision, when looking below the bottom edge of the lenses. Depending on where the bottom lens edge ends with respect lo the wearer's eye, the wearer has an upper vertical or a distance-viewing field of vision in the range of about 55–90 degrees and a lower vertical or close-up field of vision in the range of about 40 to 80 degrees. Preferably, the bottom edge of the lens is horizontally aligned with the bottom edge of the wearer's exposed cornea. In this position, the frame has an upper vertical or a distance-viewing field of vision in the range of about 70–90 degrees and an uncorrected lower vertical or a close-up field of vision of about 45–65 or more degrees, such as 50 degrees or more, for example.

The present invention also includes a method of viewing distant objects through corrective lenses to correct for myopia without correcting for close-up vision and without requiring the wearer to re-position the corrective lenses. The method comprises providing a substantial upper corrected vertical field of vision and a substantial lower uncorrected vertical field of vision, such as by positioning, on the upper bridge of the wearer's nose, eyeglasses as previously described. The left lens is in optical registry with the wearer's left eye and the right lens is in optical registry with the wearer's right eye. The bottom edges of the lenses are located relative to the eyes at between about 3 mm below the center of the wearer's pupil and 3 mm below the bottom of the wearer's cornea to provide substantial upper corrected and lower uncorrected vertical fields of vision as previously described without any repositioning of the eyeglasses on the wearer. The wearer can look through the lenses to clearly view objects at a distance and to utilize the upper corrected field and can look below the bottom edge of the lenses to view objects nearby and to utilize the lower uncorrected field, all without repositioning the frame.

Also provided is a method for people wearing eyeglasses to correct for distant vision but not needing glasses to view nearby objects, wherein the eyeglasses are as previously described and may include the aforedescribed, inventive frame having no viewing restriction below the bottom of the lenses. The eyeglasses are worn so that the bottom edge of each lens is substantially horizontal and unobstructed by the frame so that when the frame is mounted on the wearer's nose bridge, the location of the bottom lens edge with respect to the wearer's eyes defines a substantial upper corrected vertical field of vision in which the wearer can view objects at a distance and a substantial lower uncorrected vertical field of vision in which the wearer can view objects nearby without looking through the lenses and without repositioning the frames or the lenses. The method comprises positioning or wearing the eyeglasses to provide such fields of vision, looking through the lenses to view objects at a distance to utilize the upper corrected vertical field of vision and looking beneath the bottom edge of the lenses to view objects close-up to utilize the lower uncorrected vertical field of vision, without repositioning the eyeglasses.

Thus in accordance with the invention, the inventive eyeglasses and method provide two substantial vertical fields of vision or viewing areas particularly suited for myopic individuals requiring correction for distance but not requiring correction to readily view, in focus, objects that are relatively close. The upper vertical field of vision is for clearly viewing distant objects by looking through the lenses, and the second area or lower vertical field of vision is for viewing nearby objects by looking beneath the lens without having to reposition the frame or the lenses.

BRIEF DESCRIPTION OF THE DRAWINGS

Other objects and advantages of the invention will become apparent upon reading the following detailed description and upon reference to the drawings, in which:

FIG. 1 is a perspective view of eyeglasses in accordance with the invention being worn by a person;

FIG. 2 is side elevation view of eyeglasses and wearer shown in FIG. 1, illustrating the lower vertical field of vision for viewing nearby objects without use of corrective lenses.

FIG. 3 is a side view of eyeglasses and wearer shown in FIG. 1, illustrating the upper vertical field of vision for viewing distant objects through the corrective lenses.

DETAILED DESCRIPTION

Figure 4:
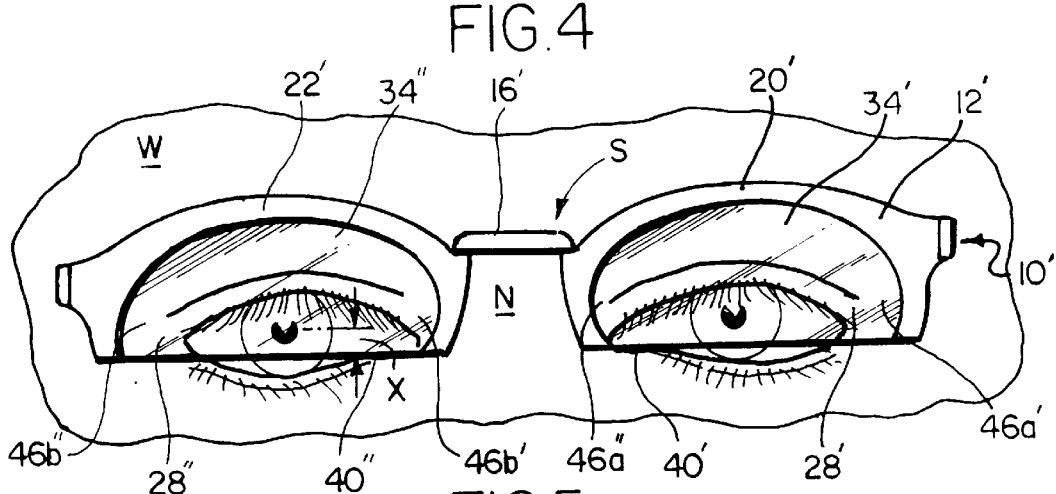
FIG. 4 is a front elevation view illustrating an alternate embodiment of the eyeglasses in accordance with the invention wherein the bottom edge of the lenses is parallel with a horizontal line about 1 mm beneath the bottom of the wearer's cornea.

This invention includes all alternatives, modifications, and equivalents that may be encompassed within the spirit and scope of the invention, as defined by the appended claims. Where a preferred embodiment is described below, the invention is not limited to that embodiment. Throughout the following, like numerals refer to like parts or steps.

Referring to the FIGURES generally, eyeglasses in accordance with the present invention are illustrated. Shown in FIG. 1 are eyeglasses 10 positioned on the upper bridge S of the nose N of wearer W. Eyeglasses, 10 comprise a frame 12 and lenses 14' and 14". Frame 12 includes a left lens support 20, a right lens support 22, and a bridge 16 connecting lens supports 20, 22. Frame 12 has mounted thereto left lens 14' affixed in left lens support 20 and right lens 14" affixed in right lens support 22. Left lens 14' is in vertical alignment with left lens support 20 and right lens 14" is in vertical alignment with right lens support 22. Lenses 14', 14" extend downwardly from lens supports 20, 22. Frame 12 further includes two temple bars 32 which may be pivotably attached to frame 12 for holding eyeglasses 10 in place when worn. Because corrective lenses, as well as elongated side members for placing above the wearer's ears to hold glasses 10 in place, are well known in the art, a detailed disclosure of these elements is not provided here.

The shape of the lenses and frames can be generally as desired, as long as the desired upper and lower fields of vision are provided as described herein. Typically, the shape of the lenses will generally correspond to the associated lens support to facilitate mounting of the lens. Also, generally, lens supports 20 and 22 will be open along the bottom portion of lenses 14' and 14" (i.e., frame 12 does not extend along the bottom edges of lenses 14' and 14".) to avoid any viewing obstruction below the bottom edges of the lenses. Alternatively, a relatively thin frame support (not shown) could be provided below bottom edges 40' and 40". In addition, typically bottom edges 38' and 38" of lenses 14' and 14". will be straight or generally straight to provide the desired upper and lower vertical viewing fields. Some curvature could be provided in the bottom edge, such as a concave or a convex curvature, particularly a concave curvature.

Figure 5:
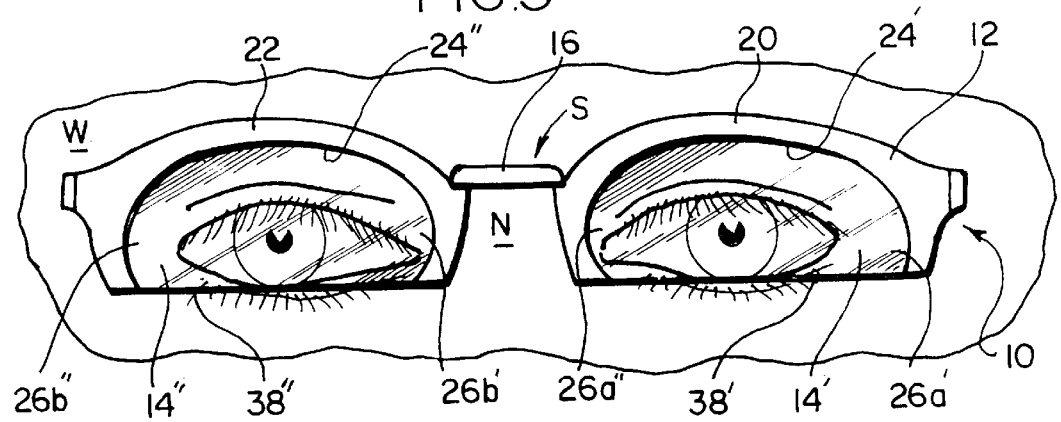
FIG. 5 is a front elevation view illustrating the eyeglasses in FIG. 1 wherein the bottom edge of the lenses is parallel with a horizontal line intersecting the bottom of the wearer's cornea.

When eyeglasses 10 are worn with frame 12 positioned in place on the upper bridge of the wearer's nose N as shown in FIG. 5, left lens 14' is in optical registry with the wearer's left eye, and right lens 14" is in optical registry with the wearer's right eye to create an upper corrected vertical field of vision through lenses 14', 14" for viewing objects at a distance. The closest distance of lenses 14', 14" to the outer center of the wearer's cornea is the standard typical distance for eyeglasses, usually in the range of about 5 to 30 mm, for example, when measured in a horizontal plane. Glasses 10 create an upper vertical field of vision B for viewing distant objects through the lenses. Lenses 14', 14" have top edges 24', 24", bottom edges 38', 38", sides 26a', 26a" on left lens 14' and sides 26b', 26b" on right lens 14". Bottom edges 38', 38" substantially align horizontally near the lower half of the wearer' eye, typically at a selected point in the range of about from 3 mm beneath the center of the wearer's pupil to about 3 mm beneath the bottom edge of the wearer's cornea. Such positioning creates a lower vertical uncorrected field of vision A below the bottom edge of the lenses for viewing objects such as object J close-up without repositioning the frame. The field of the viewing areas for both distance (upper field) and near vision (lower field) depends upon where bottom edges 38', 38" align with respect to the wearer's eye and the distance of the lenses from the eyes. Generally, the upper vertical field of vision (corrected by the lenses) for distant objects ranges from about 55 degrees to about 90 degrees and in general is smaller when bottom edges 38', 38" are positioned nearer the pupil. The lower uncorrected vertical field of vision for viewing nearby objects and tasks—i.e., without lens correction—ranges from about 40 degrees to about 80 degrees in general and is smaller when bottom edges 38', 38" are positioned vertically farther down from the pupil. In general, the ratio of distance-viewing to near-viewing vertical field angles should be in the range of about 0.68:1 to about 2.25 and more typically should be in the range of about 1.07 to about 1.88.

In the preferred embodiment shown in FIGS. 1 and 5, bottom edges 38', 38" substantially align with the bottom edge of the wearer's cornea. In this embodiment, as shown in FIG. 3, glasses 10 create an upper vertical field of vision B of about 85 degrees for viewing distant objects through the lenses (corrected vision). As shown in FIG. 2, glasses 10 also provide a lower uncorrected vertical field of vision A of about 50 degrees (below bottom edges 38', 38".) for viewing close-up objects without the wearer having to reposition frame 12. In this embodiment, the ratio of the upper field to the lower field angles is about 1.7.

Figure 7:
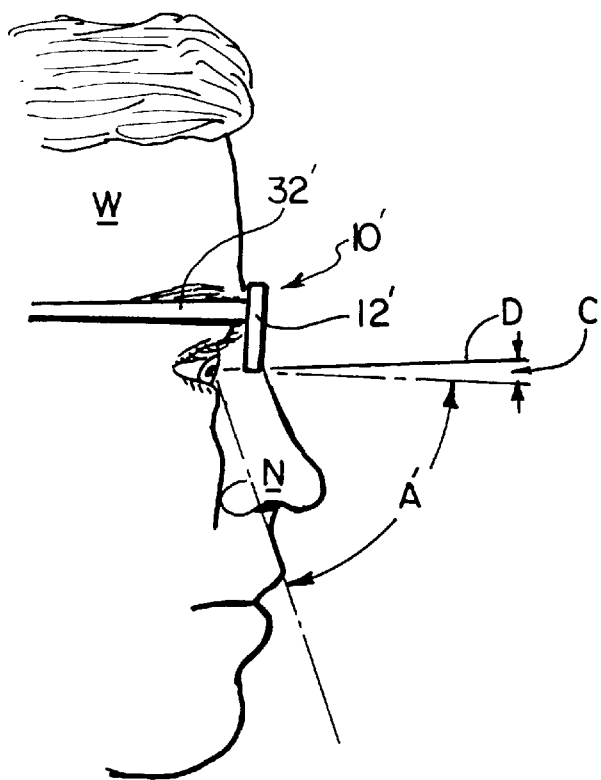
FIG. 7 is a side elevation view of eyeglasses shown in FIG. 4 illustrating the vertical field of vision of vision beneath the lens for viewing nearby objects.
Figure 8:
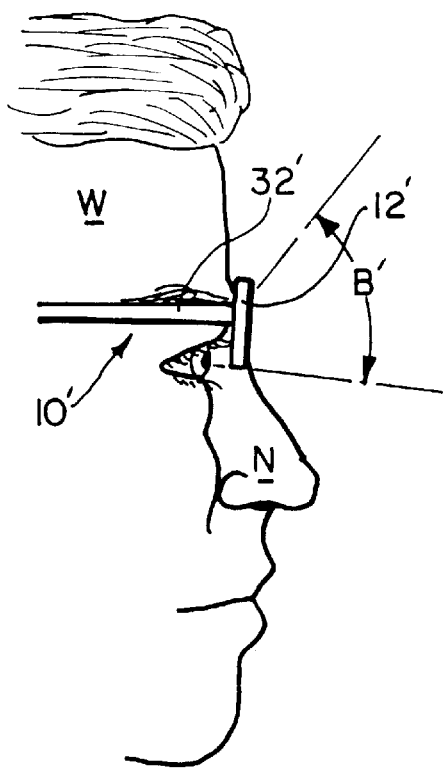
FIG. 8 is a side elevation view of eyeglasses shown in FIG. 4 illustrating the vertical field of vision through the lens for viewing distant objects.

FIGS. 4 and 7–8 illustrate another embodiment of the present invention. As shown, eyeglasses 10', similar to glasses 10, are positioned on the upper bridge of the nose N of wearer W. Eyeglasses 10' comprise components similar to eyeglasses 10 and include a frame 12' which includes a left lens support 20' and a right lens support 22'. A left lens 28' and a right lens 28" are fixed in left lens support 20' and right lens support 22', respectively, and extend downwardly from lens supports 20', 22'. Bridge 16' connects lens supports 20', 22". The height of lenses 28' and 28" and of lens supports 20' and 22' is slightly less than the height of corresponding components of eyeglasses 10, so that the upper and lower viewing angles are changed as shown in FIGS. 7 and 8 and as hereinafter described. Temple bars 32' are pivotably attached to frame 12' for supporting eyeglasses 10' in position. When frame 12' is worn normally, lenses 28', 28" are in optical registry with the wearer's left eye and right eye, respectively. Lenses 28', 28" have top edges 34', 34". bottom edges 40', 40", sides 46a', 46a" on left lens 28' and sides 46b', 46b" on right lens 28". Bottom edges 40', 40" are unobstructed by frame 12' and are located a vertical distance X of about 3 mm below the center of the wearer's pupil. Such positioning creates an upper vertical corrected field of vision B' for viewing distant objects arid a lower uncorrected vertical field of vision A' below the bottom edge of the lenses for viewing objects close-up without repositioning the frame. Field A' for near objects is about 75 degrees and the upper limit of that field is about 3 degrees below horizontal line D as indicated by angle C in FIG. 7. Area B" of vision for distant objects, with lens correction, is about 63 degrees. In this embodiment, the ratio of distance-viewing area to near-viewing area is typically about 0.84.

Figure 6:
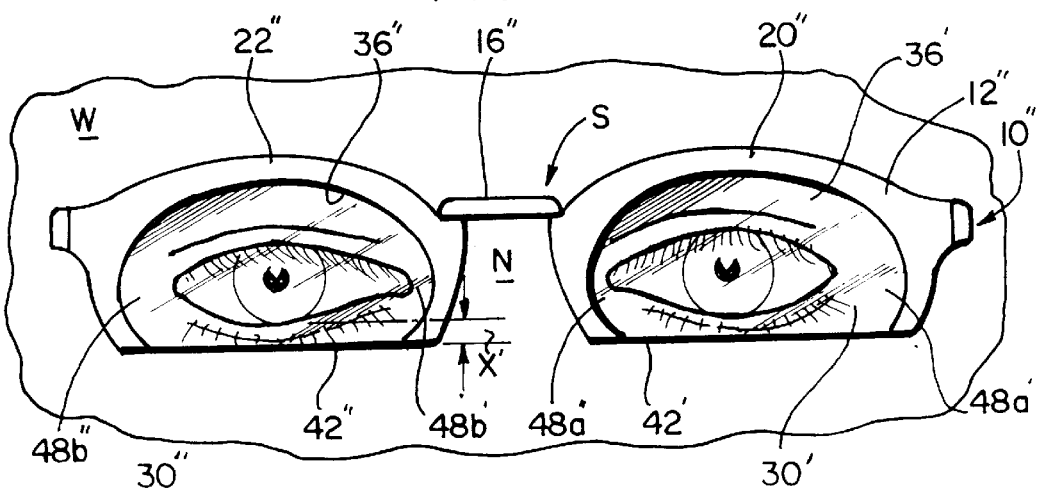
FIG. 6 is a perspective view of eyeglasses wherein the bottom edge of the lenses is parallel with a horizontal line about 3 mm beneath the bottom of the wearer's cornea.
Figure 9:
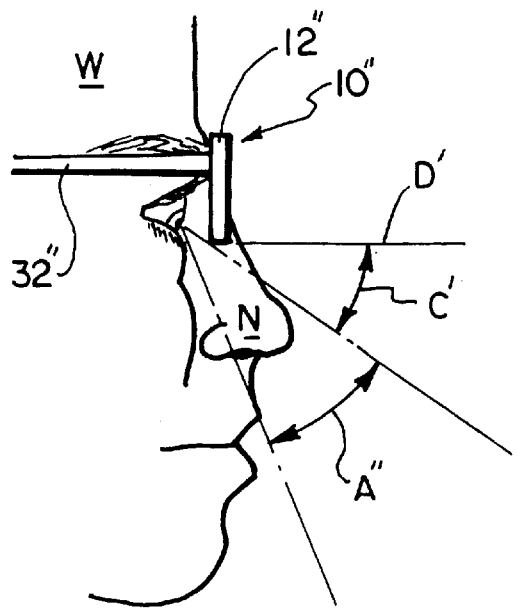
FIG. 9 is a side elevation view of eyeglasses shown in FIG. 6 illustrating the field of vision beneath the lens for seeing nearby objects.
Figure 10:
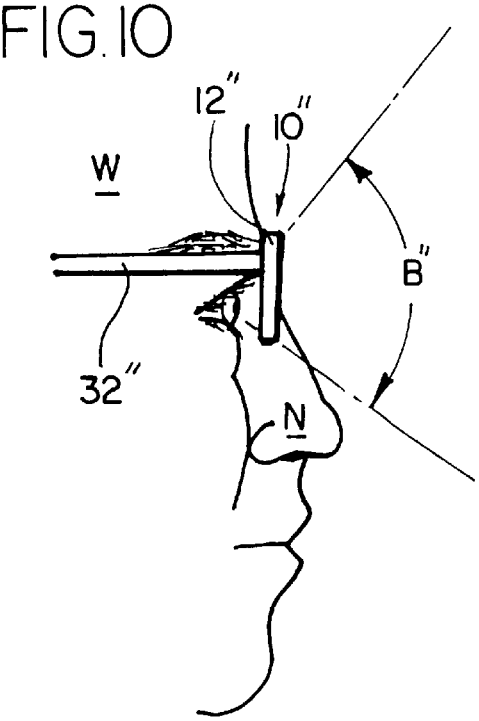
FIG. 10 is a side elevation view of eyeglasses shown in FIG. 6 illustrating the field of vision through the lens for viewing distant objects.

FIGS. 6 and 9–10 illustrate yet another embodiment of the present invention. Eyeglasses 10" comprise components similar to eyeglasses 10 and include a frame 12" which includes a left lens support 20" and a right lens support 22", connected by a bridge 16". Fixed in left lens support 20" and right lens support 22" are a left lens 30' and a right lens 30", respectively. Lenses 30', 30" extend downwardly from lens supports 20", 22". When frame 12" is positioned on the bridge of the wearer's nose, as shown in FIGS. 6 and 9–10, lens supports 20", 22" are in vertical alignment with the wearer's left and right eyes, respectively, and lenses 30', 30" are in optical registry with the wearer's left eye and right eye, respectively. The height of lenses 30' and 30" and of lens supports 20" and 22" is greater than the height of corresponding components of eyeglasses 10, so that the upper and lower viewing angles are changed as hereinafter described. Lenses 30', 30" have top edges 36', 36", bottom edges 42', 42" sides 48a', 48a" on left lens 30', and sides 48b', 48b" on right lens 30". Unobstructed by frame 12", bottom edges 42', 42" are substantially aligned horizontally with a horizontal line located a distance X' of about 3 mm below the wearer's cornea. Frame 12" is held in position on the wearer's nose by temple bars 32", pivotably attached to frame 12" near lens sides 48a', 48b". When eyeglasses 10" are in the normal wearing position, the lenses provide an upper corrected vertical field of vision B" for viewing objects located at a distance and a lower uncorrected vertical field of vision A" for viewing objects close-up by looking below bottom edges 42', 42" and without repositioning eyeglasses 10". Lower field A" for viewing nearby objects without lens correction is about 40 degrees and the upper limit of that field is about 30 degrees below horizontal line D' as indicated by angle C" in FIG. 9. Upper field B" for viewing distant objects with lens correction is about 90 degrees. Generally, in this embodiment, the ratio of distance-viewing area to near-viewing area is about 2.25.

In accordance with the present invention, a method is provided for viewing objects at a distance through lenses for correcting myopia and viewing objects nearby without lens correction using the aforedescribed, inventive eyeglasses 10, 10', 10". As such eyeglasses 10, 10', 10" have been described in detail above, further description is not provided here. The method comprises positioning eyeglasses in accordance with the invention in the normal wearing position, such as eyeglasses 10, 10', 10" in FIGS. 5, 4 and 6, respectively, so that left lens 14', 28', 30' is in optical registry with the wearer's left eye and right lens 14", 28", 30" is in optical registry with the wearer's right eye to provide a substantial lower uncorrected vertical field of vision A, A', A" and a substantial upper corrected vertical field of vision B, B', B" as previously described with respect to FIGS. 1–10. Thereafter, the wearer can look through the lenses to view objects at a distance utilizing the upper corrected field and can look below the bottom edge of the lenses (such as 38', 38", 40', 40", 42', and 42", for example) to view objects close-up without lens correction, utilizing the uncorrected lower field of vision, all without repositioning the eyeglasses.

One advantage conferred by the present invention is that it addresses a problem encountered by people needing correction for distance but no correction for viewing nearby objects or doing close-up tasks. In addition, the invention has the advantage of enabling myopic or nearsighted people with presbyopia to readily view in great detail and with precision close objects without corrective lenses. The present invention permits wearers of the inventive eyeglasses to enjoy the benefits of lens correction for distance while also being able to view close-up objects with great precision and in detail without lens correction.

Another advantage is that the inventive eyeglasses eliminate the annoying need for the wearer to reposition the frame when switching from viewing distant objects to viewing nearby objects. With the inventive glasses, the myopic wearer can read very fine print or otherwise view in great detail close objects while having a substantial corrected field of vision to permit the accurate and corrected viewing of relatively distant objects.

Although the present invention has been described with respect to specific embodiments thereof, it will be understood that various changes and modifications will be suggested to one skilled in the art and it is intended that the invention encompass such changes and modifications as fall within the scope of the appended claims.

I claim:

1. A pair of eyeglasses for providing the person wearing the eyeglasses a substantial upper vertical corrected field of vision and a substantial lower vertical uncorrected field of vision, comprising:

right and left lenses, each having a bottom edge;

a frame, including a lens support structure to be worn over the bridge of the wearer's nose, carrying the left lens and the right lens, said lenses and frame configured so that when said frame is worn by the person in a normal wearing position, said left lens is in optical registry with the wearer's left eye and said right lens is in optical registry with the wearer's right eye to define a substantial upper vertical corrected field of vision for viewing objects at a distance through the lenses and a substantial lower vertical uncorrected field of vision extending downwardly from the bottom edges of the lenses for viewing close objects by looking beneath the bottom edge of the lenses without repositioning the eyeglasses to utilize said upper and lower vertical fields of vision;

wherein the bottom edge of each of the lenses is straight and unobstructed by the frame and when said eyeglasses are worn by a person in the normal wearing position, the bottom edge of each lens is horizontal and located in vertical alignment with the bottom edge of the wearer's cornea.

2. A pair of eyeglasses for providing the person wearing the eyeglasses a substantial upper vertical corrected field of vision and a substantial lower vertical uncorrected field of vision, comprising:

right and left lenses, each having a bottom edge;

a frame, including a lens support structure to be worn over the bridge of the wearer's nose, carrying the left lens and the right lens, said lenses and frame configured so that when said frame is worn by the person in a normal wearing position, said left lens is in optical registry with the wearer's left eye and said right lens is in optical registry with the wearer's right eye to define a substantial upper vertical corrected field of vision for viewing objects at a distance through the lenses and a substantial lower vertical uncorrected field of vision extending downwardly from the bottom edges of the lenses for viewing close objects by looking beneath the bottom edge of the lenses without repositioning the eyeglasses to utilize said upper and lower vertical fields of vision; and wherein the upper vertical corrected field is in the range of about 70° to 90° and the lower vertical uncorrected field is in the range of about 45° to 65°.

3. The eyeglasses of claim 2 wherein the upper corrected field is about 85° and the lower uncorrected field is about 50°.

4. The eyeglasses of claim 2 wherein said lenses each have a height in the range of about 2 to about 3 centimeters.

5. The eyeglasses of claim 2 wherein the lenses correct for myopia.

6. The eyeglasses of claim 2 wherein said lenses each have a height in the range of about 2 to about 3 centimeters and the bottom edge of each of the lenses is straight and unobstructed by the frame.

7. A pair of eyeglasses for providing the person wearing the eyeglasses a substantial upper vertical corrected field of vision and a substantial lower vertical uncorrected field of vision, comprising:

right and left lenses, each having a bottom edge;

a frame, including a lens support structure to be worn over the bridge of the wearer's nose, carrying the left lens and the right lens, said lenses and frame configured so that when said frame is worn by the person in a normal wearing position, said left lens is in optical registry with the wearer's left eye and said right lens is in optical registry with the wearer's right eye to define a substantial upper vertical corrected field of vision for viewing objects at a distance through the lenses and a substantial lower vertical uncorrected field of vision extending downwardly from the bottom edges of the lenses for viewing close objects by looking beneath the bottom edge of the lenses without repositioning the eyeglasses to utilize said upper and lower vertical fields of vision;

wherein the substantial upper vertical corrected field of vision is in the range of about 55° to 90° and the substantial lower vertical uncorrected field of vision is in the range of about 40° to 80°; and wherein the ratio of the upper corrected field to the lower uncorrected field is in the range of about 1.1 to about 1.9.

8. The eyeglasses of claim 7 wherein said upper field to said lower field ratio is about 1.7.

9. A pair of eyeglasses for providing the person wearing the eyeglasses a substantial upper vertical corrected field of vision and a substantial lower vertical uncorrected field of vision, comprising:

right and left lenses, each having a bottom edge;

a frame, including a lens support structure to be worn over the bridge of the wearer's nose, carrying the left lens and the right lens, said lenses and frame configured so that when said frame is worn by the person in a normal wearing position, said left lens is in optical registry with the wearer's left eye and said right lens is in optical registry with the wearer's right eye to define a substantial upper vertical corrected field of vision for viewing objects at a distance through the lenses and a substantial lower vertical uncorrected field of vision extending downwardly from the bottom edges of the lenses for viewing close objects by looking beneath the bottom edge of the lenses without repositioning the eyeglasses to utilize said upper and lower vertical fields of vision;

wherein the substantial upper vertical corrected field of vision is in the range of about 55° to 90° and the substantial lower vertical uncorrected field of vision is in the range of about 40° to 80°; and wherein the ratio of the upper corrected field to the lower uncorrected field is about 0.84.

\* \* \* \* \*